United States Patent [19]
Ueno et al.

[11] 4,435,550
[45] * Mar. 6, 1984

[54] METHOD FOR POLYMERIZING α-OLEFIN

[75] Inventors: Haruo Ueno, Chiba; Takefumi Yano, Ichihara; Tokuji Inoue, Ichihara; Shigeru Ikai, Ichihara; Yoshiyuki Kai, Ichihara; Michimasa Shimizu, Ichihara, all of Japan

[73] Assignee: UBE Industries, Ltd., Chiba, Japan

[*] Notice: The portion of the term of this patent subsequent to Oct. 27, 1998 has been disclaimed.

[21] Appl. No.: 356,475

[22] Filed: Mar. 9, 1982

[30] Foreign Application Priority Data

Mar. 19, 1981 [JP] Japan ................. 56-38643

[51] Int. Cl.$^3$ ................. C08F 4/02; C08F 10/04
[52] U.S. Cl. ................. 526/73; 525/268; 526/127; 526/128; 526/351; 526/904
[58] Field of Search ................. 526/127, 128, 73; 525/268

[56] References Cited

U.S. PATENT DOCUMENTS 4,287,328  9/1981  Kikuta et al. ................. 526/122
4,297,463 10/1981  Ueno et al. ................. 526/127

Primary Examiner—Edward J. Smith
Attorney, Agent, or Firm—Burgess, Ryan & Wayne

[57] ABSTRACT

Poly-α-olefin, for example, polypropylene, is produced by subjecting a feed containing an α-olefin having 3 or more carbon atoms, to a preliminary polymerization at 40° C. or less in the presence of a catalyst which comprises (A) a solid catalytic ingredient prepared (a) by reacting a Grignard compound of the formula, $R^3MgX$ wherein $R^3 = C_{1-8}$ alkyl and $X$ = halogen, with a reaction product of an aluminium halide with an organic silicon compound of the formula, $R_n^1Si(OR^2)_{4-n}$, wherein $R^1 = C_{1-8}$ alkyl or phenyl, $R^2 = C_{1-8}$ alkyl, $n = 0$, or 1 to 3, (b) bringing the resultant solid carrier into a first contact with titanium tetrahalide, (c) treating the resultant titanium-containing solid product with an organic acid ester, and, finally, (d) bringing the treated solid product into a second contact with titanium tetrahalide; (B) another catalytic ingredient consisting of a trialkyl aluminium of the formula, $AlR_3^4$ wherein $R^4 = C_{2-6}$ alkyl; and a further catalytic ingredient consisting of an organic acid ester, and then, by subjecting a polymerization mixture containing the above-mentioned catalyst, the preliminary polymer and free α-olefin to a final polymerization at a temperature above 40° C.

29 Claims, No Drawings

METHOD FOR POLYMERIZING α-OLEFIN

FIELD OF THE INVENTION

The present invention relates to a method for polymerizing an α-olefin. More particularly, the present invention relates to a method for polymerizing a feed containing at least one α-olefin having 3 or more carbon atoms.

BACKGROUND OF THE INVENTION

It is known that an α-olefin can be polymerized by using a catalyst composed of a solid catalytic ingredient in which a titanium tetrahalide is carried on a magnesium compound and another component which consists of an organic aluminium compound. With respect to the above-mentioned polymerization, various approaches have been attempted to provide a new method which is effective for increasing the yield of the resultant polymer per unit weight of the solid catalytic ingredient in the catalyst used, to such an extent that the resultant polymer contains a very small content of the used catalyst therein and, therefore, an operation for removing the used catalyst from the resultant polymer can be omitted.

However, the attempted approaches were not always satisfactory. That is, some of the attempted approaches were not effective for increasing the yield of the resultant polymer to such an extent that the operation for removing the used catalyst from the resultant polymer could be completely omitted.

Recently, it was found that when a polyolefin produced by using the above-mentioned type of catalyst was directly used in a process for producing a shaped polymer article, without removing the residual catalyst from the polymer, the shaping apparatus, for example, a mold, was corroded by a halogen contained in the residual catalyst in the polymer. This phenomenon is now a large problem in the polyolefin industry. For example, in Polymer Journal, 19, 597~602 (1980), it is pointed out that the corrosion of the mold in the molding procedure of the polyolefin cannot be prevented unless the content of halogen in the α-olefin polymer is 30 ppm or less; in other words, the yield of the α-olefin polymer should be approximately 33,000 g or more per gram of the halogen atoms in the solid catalytic ingredient in the catalyst used.

Japanese Patent Application Laid-open Nos. 53-30681 (1978) and 55-75409 (1980) disclose a method for producing a polyolefin in an increased yield thereof, respectively. In this method, a feed containing an α-olefin is brought into contact with a catalyst composed of a specific solid catalytic ingredient and an organic aluminium compound to preliminarily polymerize the α-olefin, and, then, the feed is subjected to a final polymerization in the presence of the above-mentioned catalyst and the preliminary polymerization product. However, the yield of the resultant poly α-olefin obtained in the above-mentioned method is unsatisfactory. For example, according to Example 1 of Japanese Patent Application Laid-open No. 55-75409, the yield of the resultant poly α-olefin is only approximately 5,300 g per gram of the solid catalytic ingredient per hour of the polymerizing time. This yield is still unsatisfactory and, for the purpose of preventing the undesirable corrosion of the mold, it is indispensable to remove the residual catalyst from the α-olefin polymer used for the shaping procedure.

Previously, the inventors of the present invention provided an invention relating to a method for polymerizing an α-olefin at a large yield of the resultant α-olefin polymer per gram of the solid catalytic ingredient, especially, per gram of halogen atoms in the solid catalytic ingredient. This method is disclosed in Japanese Patent Application Laid-open Nos. 56-45909 (1981) and 56-163102 (1981).

However, it is still strongly desired to provide a new method effective for producing an α-olefin polymer at a larger yield thereof per gram of the solid catalytic ingredient used, more especially, per gram of halogen atoms in the solid catalytic ingredient used, than that of conventional methods, which new method allows the operation for removing the residual catalyst from the resultant polymer to be completely omitted.

SUMMARY OF THE INVENTION

An object of the present invention is to provide a method for polymerizing an α-olefin by using such a very small amount of a catalyst that it is not necessary to remove the used catalyst from the resultant polymer.

Another object of the present invention is to provide a method for polymerizing an α-olefin, so that the resultant α-olefin polymer can be used in a shaping apparatus without causing corrosion of the apparatus.

Still another object of the present invention is to provide a method for polymerizing an α-olefin by using a catalyst which exhibits an excellent durability in catalytic activity.

A further object of the present invention is to provide a method for polymerizing an α-olefin by using a catalyst which exhibits an excellent sensitivity to hydrogen as a molecular weight-regulating agent for the resultant polymer, and which causes the amount of hydrogen necessary for regulating the molecular weight of the resultant polymer to be small.

The above-mentioned objects can be attained by the method of the present invention which comprises (1) a preliminary polymerization step wherein a feed containing at least one α-olefin having 3 or more carbon atoms is brought, at a temperature of 40° C. or less, into contact with a catalyst comprising (A) a first solid catalytic ingredient which has been prepared in such a manner that (a) a Grignard compound of the formula (I):

$$R^3 M_g X \qquad (I)$$

wherein $R^3$ represents an alkyl radical having 1 to 8 carbon atoms and X represents a halogen atom, is reacted with a reaction product of an aluminium halide with an organic silicon compound of the formula (II):

$$R_n^1 Si(OR^2)_{4-n} \qquad (II)$$

wherein $R^1$ represents a member selected from the group consisting of alkyl radicals having 1 to 8 carbon atoms and a phenyl radical, $R^2$ represents an alkyl radical having 1 to 8 carbon atoms and n represents an integer of 0, 1, 2 or 3, (b) the resultant solid carrier is brought into a first contact with a titanium tetrahalide, (c) the resultant titanium-containing solid product is treated with an organic acid ester and, finally, (d) the treated solid product is brought into a second contact with a titanium tetrahalide; (B) a second catalytic ingredient consisting of at least one trialkyl aluminium of the formula (III):

$$AlR_3^4 \qquad (III)$$

wherein $R^4$ represents alkyl radical having 2 to 6 carbon atoms; and (C) a third catalytic ingredient consisting of at least one organic acid ester, whereby at least a portion of said α-olefin is preliminarily polymerized; and, thereafter, (2) a final polymerization step wherein a polymerization mixture consisting of said catalyst, the resultant preliminary α-olefin polymer and α-olefin to be polymerized is heated at a temperature above 40° C., whereby the entire amount of α-olefin in said feed is polymerized.

DETAILED DESCRIPTION OF THE INVENTION

In the method of the present invention, the feed to be subjected to the preliminary and final polymerization procedures contains at least one α-olefin having 3 or more carbon atoms. The α-olefin may be selected from the group consisting of propylene, 1-butene, 4-methyl-1-pentene and 1-hexene. The feed may consist of either only one α-olefin having 3 or more carbon atoms or a mixture of two or more different α-olefins each having 3 or more carbon atoms. In the former case, the polymerization product is a homopolymer of the α-olefin and, in the later case, a copolymer of two or more different α-olefins is obtained.

Also, the feed may consist of a mixture of at least one α-olefin having 3 or more carbon atoms with ethylene. In this case, ethylene is copolymerized with α-olefin.

In the method of the present invention, it is essential that the polymerization of α-olefin in the feed be carried out in two steps; that is, a preliminary polymerization step and a final polymerization step, and in the presence of a specific catalyst, comprising three ingredients, namely, (A) a first solid catalytic ingredient, (B) a second catalytic ingredient and (C) a third catalytic ingredient.

In the method of the present invention, it is desirable that the preparation of the first solid catalytic ingredient and the preliminary and final polymerization procedures be carried out in an atmosphere consisting of an inert gas, for example, nitrogen and argon gases. Also, it is desirable that the materials to be used for the preparation of the first solid catalytic ingredient be substantially free from water.

The aluminium halide is usually selected from the group consisting of aluminium chloride, aluminium bromide and aluminium iodide. The most useful aluminium halide is aluminium chloride.

The organic silicon compound of the formula (II), $R_n^1Si(OR^2)_{4-n}$, may be selected from the group consisting of tetramethoxysilane, tetraethoxysilane, tetra-n-propoxysilane, tetra-n-butoxysilane, tetra-iso-pentoxysilane, tetra-nhexoxysilane, methyl trimethoxysilane, methyl triethoxysilane, methyl tri-n-butoxysilane, methyl tri-iso-pentoxysilane, methyl tri-n-hexoxysilane, methyl tri-iso-octoxysilane, ethyl triethoxysilane, ethyl tri-iso-propoxysilane, ethyl tri-iso-pentoxysilane, n-butyl triethoxysilane, isobutyl triethoxysilane, isopentyl triethoxysilane, isopentyl tri-n-butoxysilane, dimethyl diethoxysilane, dimethyl-di-n-butoxysilane, dimethyl di-iso-pentoxysilane, diethyl diethoxysilane, diethyl di-iso-pentoxysilane, di-n-butyl diethoxysilane, di-isobutyl di-iso-pentoxysilane, trimethyl methoxysilane, trimethyl ethoxysilane, trimethyl isobutoxysilane, triethyl isopropoxysilane, tri-n-propyl ethoxysilane, tri-n-butyl ethoxysilane, tri-iso-pentyl ethoxysilane, phenyl triethoxysilane, phenyl tri-iso-butoxysilane, phenyl tri-iso-pentoxysilane, diphenyl diethoxysilane, diphenyl di-iso-pentoxysilane, diphenyl dioctoxysilane, triphenyl methoxysilane, triphenyl ethoxysilane and triphenyl isopentoxysilane.

In the preparation of the reaction product of the aluminium halide and the organic silicon compound, it is preferable that the aluminium halide be used in an amount of from 0.1 to 10 moles, more preferably from 0.3 to 2 moles, per mole of the organic silicon compound. The reaction of the aluminium halide with the organic silicon compound is usually carried out by stirring a solution of both the aluminium halide and the organic silicon compound in an inert organic solvent, at a temperature of from −50° C. to 100° C. for 0.1 to two hours. This reaction is exothermic and the resultant reaction product is obtained in the form of a solution in the inert organic solvent. In the case where an organic silicon compound of the formula (II), in which n is zero, that is, a tetralkoxysilane, is used, the resultant reaction product, sometimes, may contain a small amount of an insoluble substance. Though this insoluble substance does not cause a reduction in the catalytic activity of the resultant catalyst, it is preferable that the insoluble substance be eliminated from the reaction product by means of filtration, so as to make the preparation procedure of the first solid catalytic ingredient easy. Usually, the reaction product is not isolated from the solution. That is, the solution of the reaction product in the inert organic solvent is used for the reaction with the Grignard compound.

The inert organic solvent comprises at least one compound selected from the group consisting of aliphatic and aromatic hydrocarbons, for example, hexane, heptane, benzene and toluene, and halogenated aliphatic and aromatic hydrocarbons, for example, chlorobenzenes, dichlorohexane and dichloroheptane.

The Grignard compound usable for the method of the present invention is of the formula (I). In the formula (I), it is preferable that X represents a chlorine atom. That is, the Grignard compound is preferably selected from methylmagnesium chloride, ethylmagnesium chloride, n-butylmagnesium chloride and n-hexylmagnesium chloride.

Also, it is preferable that the Grignard compound be used in an amount of from 0.05 to 4 moles, more preferably, from 1 to 3 moles, per mole of the aluminium halide which has been reacted with the organic silicon compound.

The reaction of the Grignard compound with the aluminium halide-organic silicon compound reaction product in Step (a) can be carried out in any of the conventional reaction methods. For example, it is preferable that a solution of the Grignard compound in an ether, or a mixture of the ether and an aromatic hydrocarbon, be gradually added to a solution of the aluminium halide-organic silicon compound reaction product in the inert organic solvent. Also, it is preferable that the solution of the aluminium halide-organic silicon compound reaction product be added to the solution of the Grignard compound. The above-mentioned ether is preferably selected from those of the formula $R^5$—O—$R^6$, wherein $R^5$ and $R^6$ represent an alkyl radical having 2 to 8 carbon atoms, respectively. The preferable ethers are diethyl ether, di-isopropyl ether, di-n-butyl ether, and di-isoamyl ether.

The reaction of the Grignard compound with the aluminium halide-organic silicon compound reaction product in Step (a) is usually carried out at a temperature of from −50° to 100° C., preferably, from −20° to 25° C., for a period of time sufficient for completing the reaction, usually, about 5 minutes or more. The reaction in Step (a) results in the precipitation of a solid white reaction product from the reaction mixture. The solid white reaction product will be referred to as a solid carrier hereinafter.

The resultant solid carrier is separated from the reaction mixture. The separated solid carrier can be directly subjected to Step (b). However, it is preferable that the separated solid carrier be washed with an inert organic solvent, for example, benzene, toluene, hexane and heptane.

In step (b), the solid carrier is first brought into contact with a titanium tetrahalide, so as to allow at least a portion of the titanium used to be incorporated into the solid carrier. The titanium tetrahalide to be used in Step (b) is preferably selected from titanium tetrachloride, titanium tetrabromide and titanium tetraiodides. The most preferable titanium tetrahalide is titanium tetrachloride. Also, in Step (b), it is preferable that the titanium tetrahalide be used in an amount of one mole or more, more preferably, from 2 to 100 moles, per mole of the Grignard compound used in Step (a). In Step (b), the first contact of the solid carrier with the titanium tetrahalide is carried out in the presence or absence of an inert organic solvent, for example, benzene, toluene, hexane and heptane, at a temperature of from 20° to 200° C., preferably, from 60° to 140° C., for a period of time sufficient for completing the first contact, usually, from 0.5 to three hours.

After the first contact in Step (b) is completed, the resultant titanium-containing solid product is separated from the contacting mixture by means of filtration or decantation. The separated product is washed with an inert organic solvent and then subjected to the treatment in Step (c). The separated product contains 0.5 to 10% by weight of titanium.

The organic acid ester to be used in Step (c) can be selected from aliphatic carboxylic acid esters, aromatic carboxylic acid esters and cycloaliphatic carboxylic acid esters. However, it is preferable that the organic acid ester be selected from the aromatic carboxylic acid esters of the formula:

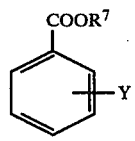

wherein $R^7$ represents an alkyl radical having 1 to 6 carbon atoms and Y represents a member selected from the group consisting of a hydrogen atom, alkyl radicals having 1 to 4 carbon atoms and radicals of the in formula $-OR^8$ in which $R^8$ represents an alkyl radical having 1 to 4 carbon atoms. The preferable organic acid esters for step (c) are methyl benzoate, ethyl benzoate, methyl toluate, ethyl toluate, methyl anisate and ethyl anisate. Also, it is preferable that the organic acid ester be used in an amount of from 5% to 30%, more preferably, from 16 to 25%, based on the weight of the solid carrier.

The treatment of Step (c) can be effected by any of the conventional treating methods for a titanium-containing solid material with an organic acid ester. However, in a preferable method, the titanium-containing solid product is suspended in an inert organic solvent, and the organic acid ester is added to the suspension while stirring the mixture, at a temperature of from 0° to 200° C., preferably, from 5 to 150° C. for a period of time sufficient for completing the treatment, usually 5 minutes or more.

The resultant treated solid product in Step (c) is separated from the treating mixture by means of filtration or decantation, and, then, washed with an inert organic solvent.

The separated solid product is subjected to a second contact with a titanium tetrahalide in step (d).

The second contact operation can be effected in the same manner as that in Step (b) so as to allow at least a portion of titanium to be incorporated in the solid product. When the second contact operation is completed, the resultant solid catalytic ingredient is separated from the second contacting mixture by means of filtration or decantation and, finally, washed with an inert organic solvent. The separated solid catalytic ingredient contains 0.5 to 5% by weight of titanium.

The resultant solid catalytic ingredient is used concurrently with the second catalytic ingredient (B) consisting of at least one trialkyl aluminium of the formula (III), and the third catalytic ingredient (C) consisting of at least one organic acid ester. The preferable trialkyl aluminiums for the present invention are triethyl aluminium, tri-isobutyl aluminium and tri-n-hexyl aluminium. The most useful trialkyl aluminiums are triethyl aluminium and tri-isobutyl aluminium.

The second catalytic ingredient is usually used in an amount of from 1 to 1,000 moles per gram atom of titanium contained in the solid catalytic ingredient contained in the catalyst.

The organic acid esters usable as the third catalytic ingredient may be selected from those usable for Step (c). The third catalytic ingredient is usually used in an amount of from 0.05 to 0.6 moles per mole of the second catalytic ingredient contained in the catalyst.

In the preliminary polymerization procedure, the feed containing the α-olefin is brought into contact with the specific catalyst in a liquid phase or a gas phase at a temperature of 40° C. or less.

When the preliminary polymerization is carried out in a liquid phase, the polymerization mixture may contain a polymerization medium, that is, an inert organic solvent consisting of at least one member selected from benzene, toluene, hexane and heptane. Also, the polymerization mixture may not contain the polymerization medium. In this case, the α-olefin itself serves as a polymerization medium.

The catalyst is suspended in any concentration in the polymerization mixture. Usually, the concentration of the catalyst is in a range of from 0.001 to 1 milligram atom, in terms of element titanium contained in the catalyst, per liter of the polymerization mixture, and in a range of from 0.01 to 100 millimoles, in terms of trialkyl aluminium contained in the catalyst, per liter of the polymerization mixture.

The preliminary polymerization is carried out at a temperature of 40° C. or less, preferably, from −10° to 30° C. and preferably under a pressure of from 1 to 80

Kg/cm$^2$. When the preliminary polymerization temperature is higher than 40° C., the resultant final polymer of α-olefin exhibits an unsatisfactory stereoregularity (tacticity).

The preliminary polymerization is carried out preferably to such an extent that the amount of the resultant preliminary polymer of α-olefin reaches a level of from 1 to 4,000 g, more preferably, from 50 to 2,000 g, per gram of the first solid catalytic ingredient.

In the preliminary polymerization procedure, a portion of the α-olefin contained in the feed may be polymerized. In this case, the remaining portion of the feed is polymerized in the final polymerization procedure. Otherwise, in the preliminary polymerization procedure, the entire amount of α-olefin contained in the feed may be polymerized. In this case, the resultant preliminary polymer of α-olefin is mixed to an additional amount of α-olefin to be polymerized in the final polymerization procedure.

The preliminary polymerization of α-olefin may be carried out in the presence of a small amount of hydrogen, if necessary. Hydrogen is effective for regulating the molecular weight of the resultant preliminary polymer of α-olefin.

In the final polymerization procedure, a polymerization mixture containing the catalyst used in the preliminary polymerization procedure, the preliminary polymer of α-olefin produced in the preliminary polymerization procedure and α-olefin to be polymerized, is heated at a temperature above 40° C., preferably, from 50° to 80° C. and preferably under a pressure of from 1 to 80 Kg/cm$^2$ to complete the polymerization of α-olefin.

The polymerization mixture for the final polymerization may consist of the resultant polymerization mixture of the preliminary polymerization procedure which contains a necessary amount of free α-olefin to be polymerized. Otherwise, the polymerization mixture for the final polymerization procedure may be a mixture of the resultant polymerization mixture of the preliminary polymerization procedure with an additional amount of α-olefin, so as to prepare a necessary amount of free α-olefin to be polymerized in the final polymerization procedure. In this case, the type of the added α-olefin may be the same as or different from the type of α-olefin preliminarily polymerized.

The final polymerization procedure may be carried out in the presence of hydrogen, so as to control the molecular weight of the resultant polymer.

The method of the present invention can produce a poly-α-olefin with a remarkably high degree of yield per a unit weight of the solid catalytic ingredient contained in the catalyst used. Therefore, it is not necessary to remove the residual catalyst from the resultant polymer.

Also, in the method of the present invention, the catalyst exhibits an excellent durability in the catalytic activity thereof. Therefore, polymerization can be effected stably.

Furthermore, the catalyst exhibits an excellent sensitivity to hydrogen which is used as a molecular weight regulating agent for the resultant polymer. Therefore, when the catalyst of the present invention is used, it is easy to regulate the molecular weight of the resultant polymer by using a small amount of hydrogen.

The specific examples presented hereinafter will serve to more fully explain how the present invention is practiced. However, it will be understood that these examples are only illustrative and in no way limit the scope of the present invention.

In the examples, the term "polymerization activity" used refers to a yield in grams of a resultant polymer per gram of a solid catalytic ingredient contained in a catalyst, per hour of polymerization time.

Also, the term "H.I." refers to a ratio in percent of the weight of a residue, remaining after a polymer is extracted with boiling n-heptane for twenty hours, to the entire weight of the polymer.

Furthermore, the term "M.I." used in the examples refers to a melt flow index of a polymer which has been measured at a temperature of 230° C. under a load of 2.16 kg/cm$^2$ in accordance with ASTM D1238.

The preparation of a solid catalytic ingredient in each example, was carried out in a dry nitrogen atmosphere.

EXAMPLE 1

(1) Preparation of First Solid Catalytic Ingredient

A suspension was prepared from 15 m moles of anhydrous aluminium chloride and 30 ml of toluene. A solution of 14.5 m moles of phenyltriethoxysilane in 10 ml of toluene was added to the suspension at a temperature of 25° C. over a period of 30 minutes while stirring the mixture. The resultant mixture was allowed to stand at a temperature of 25° C. for 60 minutes so that aluminium chloride reacted with the phenyltriethoxysilane.

The resultant reaction mixture was cooled to a temperature of −10° C., and, then, a solution of 27 m moles of n-butyl magnesium chloride in 20 ml of diisoamyl ether was added dropwise to the cooled reaction mixture over a period of 45 minutes, while the resultant mixture was stirred and kept at a temperature of −10° C. After the adding procedure was completed, the resultant mixture was heated to a temperature of 30° C. and was allowed to stand at this temperature for one hour. The resultant precipitation, that is, a solid carrier, was separated from the mixture by means of filtration and, then, washed with toluene.

4.6 g of the solid carrier was suspended in 30 ml of toluene and 13 ml of titanium tetrachloride were added to the suspension. The mixture was stirred at a temperature of 90° C. for one hour, so as to allow the solid carrier to come into contact with the titanium tetrachloride. The resultant titanium-containing solid product was filtered at the above-mentioned temperature and washed with n-heptane and, then, with toluene.

The resultant titanium-containing solid product was suspended in 30 ml of toluene, 0.82 ml of ethyl benzoate were added to the suspension, and the mixture was stirred at a temperature of 90° C. for one hour. The ester-treated solid product was filtered at 90° C. and washed with n-heptane and, then, with toluene.

The resultant ester-treated solid product was suspended in 30 ml of toluene, 14 ml of titanium tetrachloride were added to the suspension, and, then, the mixture was stirred at a temperature of 90° C. for one hour so as to bring the ester-treated solid product into contact with titanium tetrachloride. The resultant first solid catalytic ingredient was separated from the mixture at a temperature of 90° C. by means of filtration, and washed with n-heptane.

The resultant first solid catalytic ingredient in an amount of 3.36 g was suspended in 80 ml of n-heptane. The first solid catalytic ingredient contained 2.93% by weight of titanium and 53% by weight of chlorine.

(2) Preliminary Polymerization

The suspension containing 9.7 mg of the first solid catalytic ingredient was placed in a glass ampoule and the ampoule was sealed. The ampoule was placed in a 1-liter autoclave with a stirrer, and, thereafter, the autoclave was closed and air in the autoclave was replaced by nitrogen gas.

The autoclave was charged with 1.5 ml of a solution of 0.11 millimoles of p-methyl toluate in n-heptane and, then, with 2.6 ml of another solution of 0.57 millimole of triethyl aluminium in n-heptane.

Next, 600 ml of liquid propylene were introduced into the autoclave, and the autoclave was shaken.

When the temperature of the content in the autoclave was adjusted to 10° C., a stirring operation was applied to the contents in the autoclave so as to break the glass ampoule, and to start the preliminary polymerization of propylene. The preliminary polymerization operation was continued at the above-mentioned temperature for 4 hours.

Exactly the same procedures as those mentioned above were repeated, and the amount of the preliminarily polymerized propylene was determined. The amount of the preliminary polymer was approximately 1,400 g per gram of the first solid catalytic ingredient used.

(3) Final Polymerization

The temperature of the content in the autoclave was elevated to 65° C. in 3 minutes and maintained at this level for 42 minutes, so as to polymerize the remaining amount of propylene in the autoclave.

After the polymerization was completed, non-reacted propylene was discharged from the autoclave, and the broken glass ampoule was removed from the polymerization mixture. The resultant polypropylene was dried at a temperature of 50° C. under a vacuum condition for 20 hours.

231 g of white polypropylene powder were obtained. The polypropylene exhibited an H.I. of 94.0%. The polymerization activity was 29,800. It was found that the yield of polypropylene was 56,200 g per gram of chlorine atoms in the first solid catalytic ingredient used. This fact shows that the concentration of chlorine in the resultant polypropylene is approximately 18 ppm.

EXAMPLE 2

The same procedures as those described in Example 1 were carried out, except that the triethyl aluminium was used in an amount of 1.14 millimoles, the p-methyl toluate was used in an amount of 0.30 millimoles and the final polymerization time was 60 minutes. The resultant polypropylene exhibited an H.I. of 94.6%. The polymerization activity was 24,600.

COMPARATIVE EXAMPLE 1

The same procedures as those described in Example 2 were carried out, except that no preliminary polymerization procedure was carried out. The resultant polypropylene exhibited an H.I. of 94.1%. The polymerization activity was 17,000.

EXAMPLE 3

The same procedures as those described in Example 2 were carried out, except that the preliminary polymerization time was changed to one hour. The amount of the preliminarily polymerized propylene was approximately 350 g per gram of the first solid catalytic ingredient used.

Polymerization activity was 22,900 and the H.I. of the resultant polypropylene was 94.0%.

EXAMPLE 4

The same procedures as those described in Example 3 were carried out, except that in the preliminary polymerization step, triethyl aluminium and p-methyl toluate were used in amounts of 0.57 m moles and 0.14 m moles, respectively.

The polymerization activity was 23,200 and the H.I. of the resultant polypropylene was 94.3%.

EXAMPLE 5

The same procedures as those described in Example 4 were carried out, except that the preliminary polymerization temperature was changed to 30° C. The amount of the preliminarily polymerized propylene was approximately 1,650 g per gram of the first solid catalytic ingredient.

The polymerization activity was 22,500 and the resultant polypropylene exhibited an H.I. of 93.3%.

EXAMPLES 6 AND 7

In each of the Examples 6 and 7, the same procedures as those described in Example 3 were carried out, except that in the preliminary polymerization step, hydrogen gas was introduced into the autoclave until the partial pressure of the hydrogen gas in the autoclave reached the level indicated in Table 1, and p-methyl toluate was used in an amount of 0.38 m moles.

The results are indicated in Table 1.

TABLE 1

| Example No. | Partial pressure of hydrogen (Kg/cm$^2$) | Polymerization activity | H.I. (%) | M.I. (g/10 minutes) |
|---|---|---|---|---|
| 6 | 0.5 | 15,800 | 95.0 | 1.2 |
| 7 | 0.9 | 16,400 | 94.2 | 2.4 |

COMPARATIVE EXAMPLE 2

The same procedures as those described in Example 7 were carried out, except that no preliminary polymerization procedure was carried out.

The polymerization activity was 14,100 and the H.I. of the resultant polypropylene was 93.0%.

EXAMPLE 8

A catalyst was prepared by the same procedures as those described in Example 1, except that 14.5 m moles of tetraethoxysilane were used in place of phenyl triethoxysilane, and the resultant insoluble substance was filtered from the reaction product in Step (a). The resultant first solid catalytic ingredient contained 2.97% by weight of titanium and 52% by weight of chlorine. The same preliminary and final polymerization procedures as those described in Example 2 were carried out, except that the above-mentioned catalyst was used.

The results are indicated in Table 2.

EXAMPLE 9

The same procedures as those described in Example 8 were carried out, except that p-methyl toluate was used in an amount of 0.19 m moles.

The results are indicated in Table 2.

COMPARATIVE EXAMPLE 3

The same procedures as those described in Example 8 were carried out, except that no preliminary polymerization procedure was effected.

The results are indicated in Table 2.

TABLE 2

| Example No. | Polymerization activity | I.I. (%) |
|---|---|---|
| Example 8 | 18,000 | 94.7 |
| Example 9 | 24,300 | 91.0 |
| Comparative Example 3 | 12,100 | 94.6 |

We claim:

1. A method for polymerizing an α-olefin which comprises:
   (1) a preliminary polymerization step wherein a feed containing at least one α-olefin having 3 or more carbon atoms is brought, at a temperature of 40° C. or less, into contact with a catalyst comprising (A) a first solid catalytic ingredient which has been prepared in such a manner that (a) a Grignard compound of the formula (I):

$$R^3M_gX \qquad (I)$$

wherein $R^3$ represents an alkyl radical having 1 to 8 carbon atoms and X represents a halogen atom, is reacted with a reaction product of an aluminium halide with an organic silicon compound of the formula (II):

$$R_n^1Si(OR^2)_{4-n} \qquad (II)$$

wherein $R^1$ represents a member selected from the group consisting of alkyl radicals having 1 to 8 carbon atoms and a phenyl radical, $R^2$ represents an alkyl radical having 1 to 8 carbon atoms and n represents an integer of 0, 1, 2 or 3, (b) the resultant solid carrier is brought into a first contact with a titanium tetrahalide, (c) the resultant titanium-containing solid product is treated with an organic acid ester and, finally, (d) the treated solid product is brought into a second contact with a titanium tetrahalide; (B) a second catalytic ingredient consisting of at least one trialkyl aluminium of the formula (III):

$$AlR_3^4 \qquad (III)$$

wherein $R^4$ represents alkyl radical having 2 to 6 carbon atoms; and (C) a third catalytic ingredient consisting of at least one organic acid ester, whereby at least a portion of said α-olefin is preliminarily polymerized; and, thereafter,
   (2) a final polymerization step wherein a polymerization mixture consisting of said catalyst, the resultant preliminary α-olefin polymer and α-olefin to be polymerized is heated at a temperature above 40° C., whereby the entire amount of α-olefin in said feed is polymerized.

2. A method as claimed in claim 1, wherein said aluminium halide is selected from the group consisting of aluminium chloride, aluminium bromide and aluminium iodide.

3. A method as claimed in claim 1, wherein aluminium halide is used in an amount of from 0.1 to 10 moles per mole of said organic silicon compound.

4. A method as claimed in claim 1, wherein the reaction of said aluminium halide with said organic silicon compound is carried out at a temperature of from −50° to 100° C. in an inert solvent.

5. A method as claimed in claim 1, wherein said Grignard compound is used in an amount of from 0.05 to 4 moles per mole of said organic silicon compound.

6. A method as claimed in claim 1, wherein said reaction of Step (a) is carried out at a temperature of from −50° to 100° C.

7. A method as claimed in claim 1, wherein the solid carrier obtained in Step (a) is washed with an inert organic solvent consisting of at least one member selected from the group consisting of benzene, toluene, hexane and heptane.

8. A method as claimed in claim 1, wherein said titanium tetrahalide to be used in Step (b) is selected from titanium tetrachloride, titanium tetrabromide, and titanium tetraiodide.

9. A method as claimed in claim 1, wherein in Step (b), said titanium tetrahalide is used in an amount of at least one mole per mole of said Grignard compound used in Step (a).

10. A method as claimed in claim 1, wherein the first contact of said solid reaction product with said titanium tetrahalide in Step (b) is carried out at a temperature of from 20° to 200° C.

11. A method as claimed in claim 1, wherein the titanium-containing solid product prepared in Step (b) contains 0.5 to 10% by weight of titanium.

12. A method as claimed in claim 1, wherein said organic acid ester to be used in Step (c) is selected from the group consisting of aliphatic carboxylic acid esters, aromatic carboxylic acid esters and cycloaliphatic carboxylic acid esters.

13. A method as claimed in claim 1, wherein said organic acid ester to be used in Step (c) and/or as said third catalytic ingredient is selected from aromatic carboxylic acid esters of the formula:

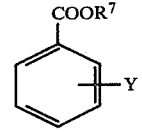

wherein $R^7$ represents alkyl radicals having 1 to 6 carbon atoms and Y represents a member selected from the group consisting of a hydrogen atom, alkyl radicals having 1 to 4 carbon atoms and radicals of the formula, $-OR^8$, in which $R^8$ represents an alkyl radical having 1 to 4 carbon atoms.

14. A method as claimed in claim 1, wherein in Step (c), said organic acid ester is used in an amount of from 5 to 30% based on the weight of said solid carrier obtained in Step (a).

15. A method as claimed in claim 1, wherein said treatment in Step (c) is carried out at a temperature of from 0° to 200° C.

16. A method as claimed in claim 1, wherein said first solid catalytic ingredient contains 0.5 to 5% by weight of titanium.

17. A method as claimed in claim 1, wherein said second catalytic ingredient is used in an amount of from 1 to 1000 moles per gram atom of titanium contained in said first solid catalytic ingredient.

18. A method as claimed in claim 1, wherein said third catalytic ingredient is used in an amount of from 0.05 to 0.6 moles per mole of said second catalytic ingredient contained in said catalyst.

19. A method as claimed in claim 1, wherein said catalyst is suspended in the polymerization mixture.

20. A method as claimed in claim 22, wherein said catalyst suspended in said polymerization mixture is in an amount, in terms of elemental titanium, of 0.001 to 1 milligram atoms per liter of said polymerization mixture.

21. A method as claimed in claim 22, wherein said catalyst suspended in said polymerization mixture is in an amount, in terms of the trialkyl aluminium, of 0.01 to 100 millimoles per liter of said polymerization mixture.

22. A method as claimed in claim 1, wherein said α-olefin is selected from the group consisting of propylene, 1-butene, 4-methyl-1-pentene and 1-hexene.

23. A method as claimed in claim 1, wherein the preliminary polymerization is carried out at a temperature of from $-10°$ to $30°$ C.

24. A method as claimed in claim 1, wherein the preliminary polymerization is carried out to such an extent that the amount of the resultant preliminary polymer of α-olefin reaches a level of from 1 to 4,000 g per gram of said first solid catalytic ingredient.

25. A method as claimed in claim 1, wherein a portion of α-olefin in said feed is polymerized in said preliminary polymerization step, and the remaining portion of α-olefin in said feed is polymerized in said final polymerization step.

26. A method as claimed in claim 1, wherein the entire amount of α-olefin in said feed is polymerized in the preliminary polymerization step, and the resultant preliminary polymer of α-olefin is mixed to an additional amount of α-olefin to be polymerized in the final polymerization step.

27. A method as claimed in claim 1, wherein the preliminary polymerization is effected under a pressure of from 1 to 80 Kg/cm$^2$.

28. A method as claimed in claim 1, wherein said final polymerization is carried out at a temperature of from $50°$ to $80°$ C.

29. A method as claimed in claim 1, wherein said final polymerization is carried out under a pressure of from 1 to 80 Kg/cm$^2$.

* * * * *